United States Patent [19]
Chen

[11] Patent Number: 5,143,346
[45] Date of Patent: Sep. 1, 1992

[54] QUICK RELEASE WATER FAUCET JOINT

[76] Inventor: Kun-Yang Chen, 9-1, Lane 161, Hsing An Road Sec. 1, Taichung, Taiwan

[21] Appl. No.: 763,910

[22] Filed: Sep. 24, 1991

[51] Int. Cl.$^5$ ............................................. F16L 37/28
[52] U.S. Cl. .................. 251/149.5; 137/801; 137/322
[58] Field of Search ............. 251/149.5, 149.1, 148; 137/322, 801

[56] References Cited

U.S. PATENT DOCUMENTS

| | | | |
|---|---|---|---|
| 939,211 | 11/1909 | Brown | 251/149.5 |
| 957,524 | 5/1910 | Wegman | 251/149.5 |
| 1,024,971 | 4/1912 | Brague | 251/149.5 |
| 2,248,701 | 7/1941 | Fowler | 251/149.5 |
| 2,598,009 | 5/1952 | Peeps | 251/149.5 |

*Primary Examiner*—A. Michael Chambers

[57] ABSTRACT

A quick release faucet joint comprises a first circular flange provided on the rear of the faucet head with a cylindrical coupling sleeve extending rearwards therefrom, and a coupling ferrule with a second flange provided on the front thereof and having an internally threaded rear portion for securement to a water outlet pipe. A set of roughly L-shaped locking grooves, formed on the periphery of the terminal end of the coupling sleeve, engage corresponding locking pins in the coupling ferrule which protrude radially inwards from the inner periphery thereof when the coupling sleeve is inserted into and rotated within the coupling ferrule, releasably securing the two together. A spring loaded positioning rod on the first flange engages a selected positioning hole on the second flange when rotated into registry to prevent further rotation of the first flange until the position rod is manually retracted.

5 Claims, 3 Drawing Sheets

QUICK RELEASE WATER FAUCET JOINT

BACKGROUND OF THE PRESENT INVENTION

The present invention relates to water faucets, and more particularly to a water faucet joint that facilitates the rapid installation or removal of a faucet head from a water outlet pipe.

Previously, the vast majority of faucet heads were secured to a water outlet pipe by a threaded coupler, usually in the form of a internally threaded retaining nut that was fastened to the threaded end of an outlet pipe by a wrench.

Though simple in principle, the installation or removal of the faucet head could prove somewhat time consuming and arduous to the uninitiated.

Aside from the time required in repeatedly turning the threaded coupler, which is usually done in increments, additional time is usually spent in finding a suitable wrench or hand tool required for the extraction.

Removal of the faucet head is also usually quite physically demanding on the part of a user, requiring him or her to perform various contortions while straining to remove a tightly fastened coupler disposed in a poorly accessible location. As such, it is not uncommon for a user who performs these operations to develop muscle sores or back aches, especially if he or she is a do it yourselfer or occasional home repairman who lacks the experience and skills of a professional plumber.

Indeed, at the present levels usually charged for professional plumbing services, a quick release water faucet would not only provide the utility of time savings and convenience but would also provide a quick return on its investment by reducing the need for professional service.

The quick release water faucet joint of the present invention overcomes the above mentioned deficiencies in conventional threadedly fastened faucet heads by providing a faucet joint that can be secured or released by simple, succint manipulations of the attached faucet head without the need of extraneous hand tools or excessive physical effort.

SUMMARY OF THE PRESENT INVENTION

The main object of the present invention is to provide a quick release water faucet joint that enables a user to speedily install or remove a water faucet without the need of extraneous hand tools.

In accordance therewith, a conventional faucet head is provided with a first flanged portion over the rear ingress of the faucet head, having a coupling sleeve extending rearwards therefrom.

The faucet head can be releasably secured to a coupling ferrule which is, attached to a water outlet pipe, by inserting the coupling sleeve therein and rotating it through a fixed angle in a counter-clockwise direction, wherein a set of locking pins protruding radially inwards from the inner periphery of the coupling ferrule engages cooperating L-shaped grooves formed on the periphery of the terminal end of the coupling to sleeve forming a bayonet type connection.

Concomitantly, a second flanged portion on the front of the coupling ferrule is brought in contact with the first flanged portion and a spring loaded positioning rod, accessibly disposed in a holder tube thereon, engages a positioning hole in the second flanged portion to prevent further rotation thereof until manually retracted.

A further object of the present invention is to provide a faucet joint that prevents the uncontrolled egress of water from a water outlet pipe when a faucet head is manually removed therefrom.

To this end, the coupling ferrule of the present invention further comprises a check valve provided with an annular valve seat secured in the coupling ferrule and a concentric, sliding valve gate to the rear thereof.

When the coupling sleeve is inserted into the coupling ferrule, forward appendages on the valve gate would come in contact with the terminal end thereof, causing the valve gate to travel rearwards and allow the flow of water to the faucet head.

In the absence of a faucet head, the valve gate would be thrust forward against the valve seat by the pressure of the water in the coupling ferrule, preventing the outflow of water therefrom.

Other objects and advantages of the present invention will become apparent in the detailed description of a preferred embodiment thereof provided below along with accompanying drawings.

A BRIEF DESCRIPTION OF THE DRAWINGS

DESCRIPTION OF THE PREFERRED EMBODIMENT

Figure 1:
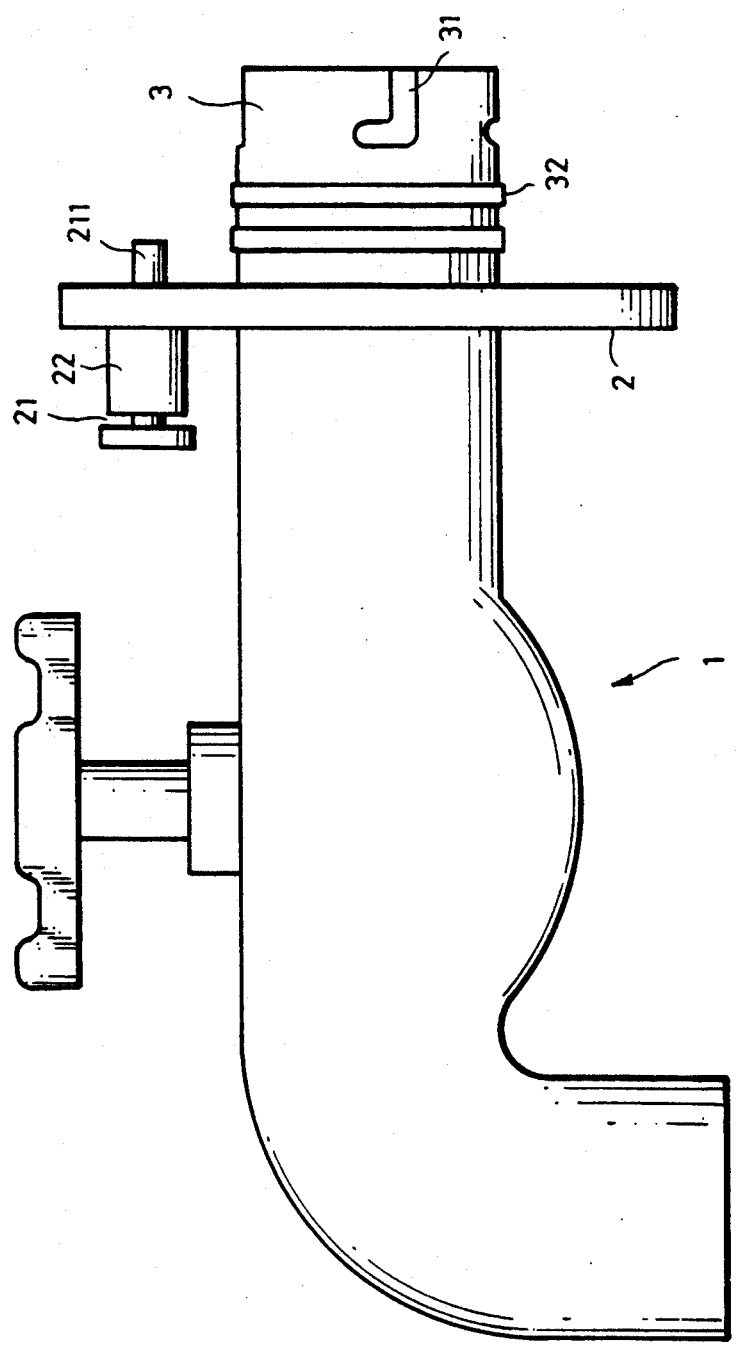
FIG. 1 is a sectional cut-away view of a faucet head and coupling sleeve of a preferred embodiment of the present invention.
Figure 2:
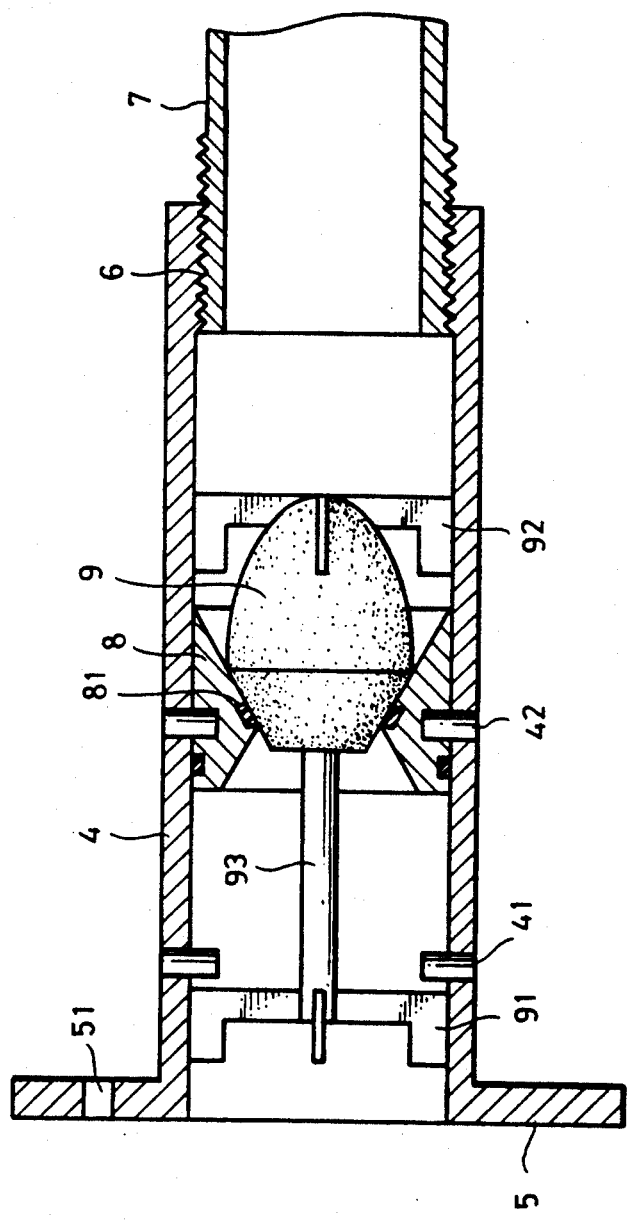
FIG. 2 is a sectional cut-away view of a coupling ferrule and attached outlet pipe of a preferred embodiment of the present invention.

Referring to FIGS. 1 and 2, the quick release faucet joint of the present invention comprises a generally circular flange 2 provided over the rear ingress of a water faucet 1 having a cylindrical coupling sleeve 3 to the rear thereof, and a cylindrical coupling ferrule 4 having a flange 5 on the front thereof and an internally threaded end portion 6 for coupling to a water outlet pipe 7.

Coupling sleeve 3 has four roughly L-shaped locking grooves 31 formed at predetermined radial positions on the periphery of the terminal end thereof, with each locking groove 31 being equally spaced from adjacent grooves 31 so as to assume an orthogonal orientation, offset from a vertical plane by a small angular separation.

Each L-shaped groove 31 has an axially aligned outer section, which extends inwards and adjoins at a right angle with an inner section that extends circumferentially in a clockwise direction.

A pair of O-ring seals 32 are disposed in respective annular recesses formed around the periphery of coupling sleeve 3, between locking grooves 31 and the rear side of flange 2.

A spring loaded positioning rod 21 is disposed within a holder tube 22 on flange 2, with the terminal end 211 thereof extending to the rear of flange 2. One end of holder tube 22 is secured within the larger diameter portion of a stepped diameter hole 23 formed at a predetermined position on flange 2, with positioning rod 21 passing through the smaller diameter portion thereof. A compression spring 25 disposed between a reentrant shoulder 22a on the other end of holder tube 22 and a retaining ring 24 attached to rod 21 biases positioning rod 21 towards a rearward position.

Positioning rod 21 and holder tube 22 are aligned with the vertical plane of the faucet passing through the valve spindle thereof.

Flange 5 of coupling ferrule 4 has a positioning hole 51 formed at a predetermined position thereon for receiving the terminal end 211 of positioning rod 21.

Four locking pins 41 are provided on coupling ferrule 4 at predetermined and equally spaced radial positions, with each locking pin 41 protruding inwards from the inner periphery thereof. Each locking pin 41 of ferrule 4 engages a corresponding locking recess 31 in coupling sleeve 3 when inserted therein.

A check valve, comprising an annular, generally nozzle shaped valve seat 8 and a roughly top shaped valve gate 9, is provided within coupling ferrule 4. The maximum diameter of valve gate 9 is greater than the diameter of the inner periphery of valve seat 8 but less than that of the inner periphery of coupling ferrule 4.

Valve seat 8, having divergent sides and a tapered sealing ring 81 disposed near the constricted inner periphery thereof, is secured within coupling ferrule 4 at a predetermined position by securing pins 42.

Valve gate 9 has a generally ovoid shaped rear portion and a tapered front portion which abuts valve seat 8 and sealing ring 81 when the check valve is in a closed state.

Valve gate 9 is slidingly secured in a concentric position within coupling ferrule 4 by a set of four generally L-shaped vanes 91 and a similar set of vanes 92 disposed respectively to the front and rear thereof.

Vanes 91 are secured in radially aligned, equally spaced positions on a central spigot 93 to the front of valve gate 9 with one end threadedly fastened therein, while vanes 92 are similarly disposed to the rear of valve gate 9 but are adjoined directly therewith. The radial extremities of vanes 91 and 92 abut the inner periphery of coupling ferrule 4 to position valve gate 9 therein.

When coupling sleeve 3 is not positioned within coupling ferrule 4, valve gate 9 is normally displaced to a forward position against valve seat 8 under the action of pressurized water from outlet pipe 7, as shown in FIG. 2.

Figure 3:
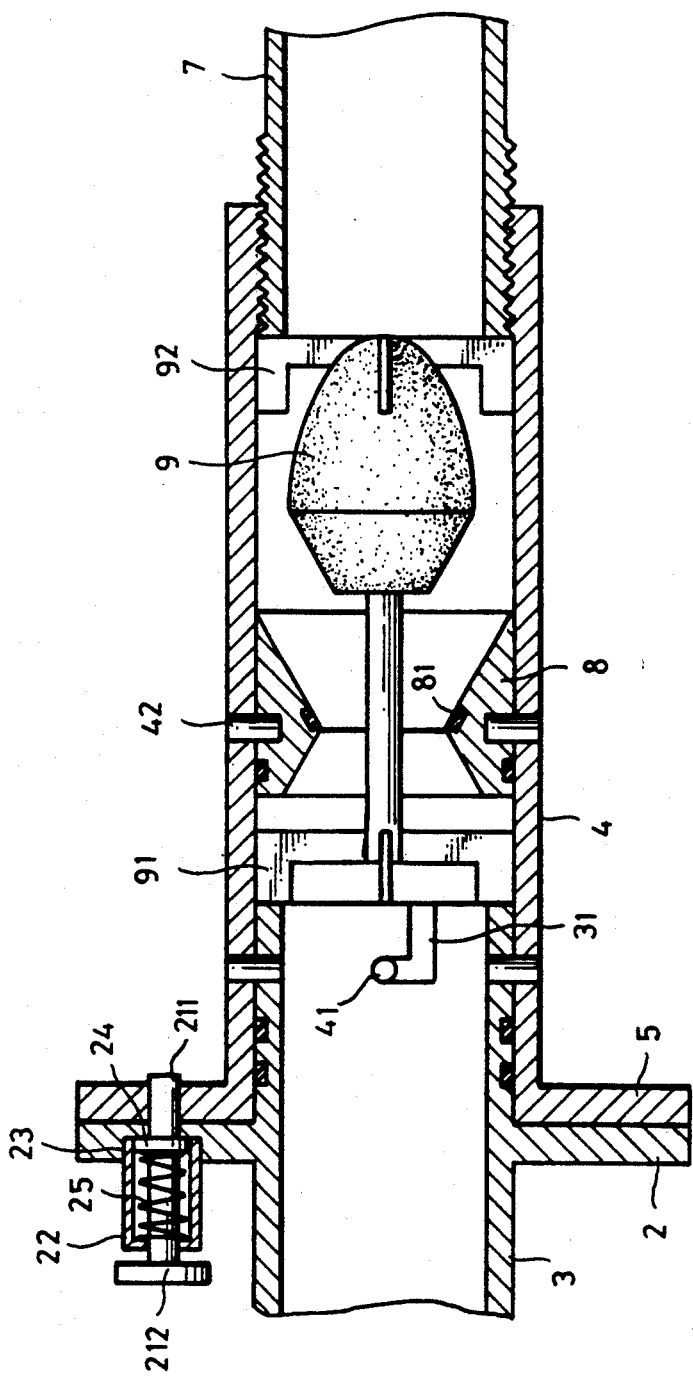
FIG. 3 is a sectional cut-away view of the coupling sleeve engaged in a locked position with the coupling sleeve.

Referring to FIG. 3, faucet head 1 can be releasably secured to coupling ferrule 4 by first inserting coupling sleeve 3 therein and then rotating faucet head 1 along with coupling sleeve 3 in a counter-clockwise direction.

Upon insertion of coupling sleeve 3 into coupling ferrule 4, with grooves 31 and locking pins 41 aligned, the rear side of flange 2 will contact the front side of flange 5, causing positioning rod 21 to displace outwards from holder tube 22, and locking pins 41 will slide to the rear of the corresponding L-shaped grooves 31, adjacent to the elbow portions thereof.

Concomitantly, after traveling a predetermined distance, the terminal end of coupling sleeve 3 will abut the ends of vanes 91 and cause valve gate 9 which initially was in a closed position to be displaced rearwards, opening the check valve and allowing water to flow therethrough.

Rotation of coupling sleeve 3 in a counter-clockwise direction then causes each locking pin 41 to come to rest in the inner terminal end of a corresponding locking groove 31.

The rotation of coupling sleeve 3 will also bring positioning rod 21 into registry with positioning hole 51 on flange 5, the angular separation between holes 23 and 51 being equal with the radial arc subtended by the inner sections of grooves 31. Upon alignment of positioning rod 21 with hole 51, the terminal end 211 will be thrust therein under the action of spring 25, preventing further rotation of coupling sleeve 3.

The removal of faucet head 1 from coupling ferrule 4 is effected by first pulling back on the head 212 of positioning rod 21 and rotating coupling sleeve 3 in a clockwise direction prior to retraction from coupling ferrule 4. With coupling sleeve 3 removed from coupling ferrule 4, valve gate 9 will be thrust forward by the pressure of the water therein and come to rest against valve seat 8 to close the check valve, preventing the egress of water therefrom.

Though the above exposition contains many specificities, these should not be construed as limitations on the scope of the present invention but merely as one mode of actualization of a preferred embodiment thereof. Many modifications and variations are possible and could be made by a person of average skill in the art without departing from the spirit or scope of the present invention.

In one significant variation, flange 5 could be provided with not one positioning hole 51 but with a plurality of holes disposed thereon at positions corresponding with the angular separation of grooves 31 and having the proper offsett, so as to enable the securement of faucet head 1 to coupling ferrule 4 at various selectable angular orientations.

Similarly, the number of locking grooves 31 and locking pins 41 can be increased or reduced accordingly. Further, the number of locking pins 41 do not necessarily have to match the number of locking grooves 31, only their positions must correspond with those of grooves 41.

As such, the spirit and scope of the present invention should not be determined from the above description but by the appended claims and their legal equivalents.

I claim:

1. A quick release faucet joint comprising:
   a first flanged portion provided over the rear ingress of a faucet head;
   a generally cylindrical coupling sleeve provided on the rear of said first flanged portion and in communication with the water ingress of said faucet head;
   at least two roughly L-shaped locking grooves formed on the periphery of the terminal end of said coupling sleeve at predetermined radial positions thereon;
   a coupling ferrule having a second flanged portion provided on the front thereof and a rear portion thereof adapted for coupling to a water outlet pipe;
   at least two locking pins provided in said coupling ferrule at predetermined positions therein, each said locking pin protruding radially inwards from the inner periphery of said coupling ferrule and adapted for engaging a said locking groove in said coupling sleeve;
   a positioning means for preventing the further rotation of said coupling sleeve relative to said coupling ferrule when said coupling sleeve is positioned within said coupling ferrule and said locking grooves are engaged with said locking pins;
   wherein, said locking grooves can be engaged with selected said locking pins by inserting said coupling sleeve into said coupling ferrule so that each said locking pin slides into a corresponding said locking groove, and rotating said coupling sleeve in a predetermined direction so that said locking pin abuts an inner terminal end of said locking groove.

2. A quick release faucet joint according to claim 1, further comprising at least one elastic ring seal disposed within a corresponding annular recess formed around the periphery of said coupling sleeve between said first flanged portion and said locking grooves.

3. A quick release faucet joint according to claim 1, wherein said positioning means comprises a spring loaded positioning rod disposed in a tubular holder provided at a predetermined position on said first flanged portion, and at least one positioning recess formed at predetermined positions on said second flanged portion, wherein said positioning rod is biased to extend through a hole in said first flanged portion with the protruding end of said positioning rod extending into a selected said positioning recess when said coupling sleeve is inserted into said coupling ferrule to bring said first and second flanged portions into proximity and rotated to bring said positioning rod and selected said positioning recess into registry.

4. A quick release faucet joint according to claim 1, further comprising a valve means for preventing the outward flow of water from said coupling ferrule when said coupling sleeve is not positioned therein.

5. A quick release faucet joint according to claim 4, wherein said valve means comprises:
- an annular valve seat fixedly secured at a predetermined position within said coupling ferrule;
- a valve gate having a maximum diameter less than that of the inner periphery of said coupling ferrule, with said valve gate being slidingly secured within said coupling ferrule between said valve gate and said rear portion thereof by at least one set of radially disposed vane like elements attached therewith and in contact with the inner periphery of said coupling ferrule.

* * * * *